(12) United States Patent
Nyman et al.

(10) Patent No.: US 8,585,928 B1
(45) Date of Patent: Nov. 19, 2013

(54) RARE-EARTH TANTALATES AND NIOBATES SUITABLE FOR USE AS NANOPHOSPHORS

(75) Inventors: May D. Nyman, Albuquerque, NM (US); Lauren E. S. Rohwer, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 498 days.

(21) Appl. No.: 12/882,342

(22) Filed: Sep. 15, 2010

Related U.S. Application Data

(60) Provisional application No. 61/328,315, filed on Apr. 27, 2010.

(51) Int. Cl.
*C09K 11/02* (2006.01)
*C09K 11/08* (2006.01)
*C09K 11/77* (2006.01)
*C01G 31/02* (2006.01)
*C01G 33/00* (2006.01)

(52) U.S. Cl.
USPC .................................. 252/301.4 R; 423/594.8

(58) Field of Classification Search
USPC .......... 252/521.1, 301.4 R; 423/62–68, 594.8
See application file for complete search history.

(56) References Cited

U.S. PATENT DOCUMENTS 7,176,500 B2 * 2/2007 Yoshimatsu et al. ............ 257/98
2007/0039814 A1 * 2/2007 Maggard ................. 204/157.15

OTHER PUBLICATIONS

Machida. Photocatalytic properties of layered perovskite tantalates, $MLnTa_2O_7$ (M ~ Cs, Rb, Na, and H; Ln ~ La, Pr, Nd, and Sm).J. Mater. Chem., 2003, 13, 1433-1437.*
Solano. heoretical study of the $YLiF_4$ phase transitions under pressure. Physical Review B 73, 094117 2006.*
Sych. Niobates and Tantalates of Tervalent Elements. Uspekhi Khimii 45 417-444 1977.*
Travis M. Anderson, et al, An aqueous route to $(Ta_6O_{19})^{8-}$ and solid-state studies of isostructural niobium and tantalum oxide complexes; Dalton Trans., 2007, 4517-4522.
Gregory K. L. Goh, et al, Hydrothermal synthesis of perovskite and pyrochlore powders of potassium tentalate, J. Mater. Res., vol. 17, No. 12, Dec. 2002, pp. 3168-3176.
May Nyman, et al, Highly Versatile Rare Earth Tantalate Pyrochlore Nanophosphors, 11652 J. Am. Chem. Soc. 2009 11652-11653.
May Nyman ,et al, Highly Versatile Rare-earth Tantalate Pyrochlore Nanophosphors, Supportig Information, Sandia National Laboratories, pp. S1-S8.
Zhihua Li, et al, Hydrothermal Synthesis and Luminescent Properties of $YBO_3$:$Tb^{3+}$. Journal of Crystal Growth 286 (2006) 487-493.
Masato Machida, et al, Synthesis and Photocatalytic Property of Layered Perovskite Tantalates, $RbLnTa_2O_7$ (Ln = La, Pr, Nd, and Sm), Chem. Mater. 2000, 12, 812-817.
May Nyman, et al, Unique $LaTaO_4$ Polymorph for Multiple Energy Applications, Chem. Mater, 2009, 21, 4731-4737.
May Nyman, et al, Aqueous Synthesis and Structural Comparison of Rare Earth Niobates and Tanatlates, Chem, Mater. 2009, 2201-2208.

* cited by examiner

*Primary Examiner* — Carol M Koslow
*Assistant Examiner* — Matthew E Hoban
(74) *Attorney, Agent, or Firm* — Carol I. Ashby; Kevin W. Bieg (57) ABSTRACT

A family of rare-earth Group 5 oxides, where the Group 5 oxide is a niobate or tantalate. The rare-earth Group 5 oxides can be doped with suitable emitter ions to form nanophosphors.

11 Claims, 6 Drawing Sheets

RARE-EARTH TANTALATES AND NIOBATES SUITABLE FOR USE AS NANOPHOSPHORS

This patent application claims priority benefit from U.S. provisional patent application Ser. No. 61/328,315, filed on Apr. 27, 2010, which is incorporated herein by reference.

CROSS-REFERENCE TO RELATED APPLICATIONS

This application, is related to the copending nonprovisional patent application entitled "Hydrothermal Method of Synthesis of Rare-Earth Tantalates and Niobates," filed on the same date of Sep. 15, 2010, and assigned to Sandia Corporation.

The United States Government has rights in this invention pursuant to Department of Energy Contract No. DE-AC04-94AL85000 with Sandia Corporation.

BACKGROUND OF THE INVENTION

This invention relates to rare-earth tantalates and niobates and a hydrothermal method for their synthesis. Rare-earth Group 5 oxides (tantalates and niobates) are refractory materials whose syntheses usually require high-temperature, solid-state methods. The rare-earth tantalates and niobates generally have high crystallization temperatures, and the incompatibility between acid-soluble rare-earth oxides and base-soluble tantalum oxides and niobium oxides renders aqueous solution synthetic techniques difficult to implement.

Rare-earth tantalates (RETs) and Rare-earth niobates (RENs) are chemically and electrochemically stable, and RETs and RENs doped with $Eu^{3+}$ or $Tb^{3+}$ can be excited by blue or UV light to provide emission in the red or green. However, they had previously been difficult materials to produce without using high-temperature solid-state processing. Well-known drawbacks to solid-state syntheses include difficulties in removing impurities and difficulties in discovering and recovering new phases and/or compositions. Solid-state synthesis is also often not well suited for obtaining controlled nanoparticles or forms suitable for coating applications that would be of great utility in devices such as light-emitting diodes (LEDs).

A simple solution-based synthetic method for rare-earth Group 5 oxides would be highly desirable, but reliable solution methods of synthesizing such materials with good control of the crystalline structure and especially good control of the process for the formation of nanoparticles of the rare-earth Group 5 oxides is lacking.

Wong et al. (U.S. Pat. No. 7,585,474) purports to report a set of methods for making a single crystal ternary nanostructure of composition $A_xB_yO_z$. While Wong claims a sol-based method and a molten-salt method of making an extraordinarily wide range of $A_xB_yO_z$ compounds comprising almost every known metal in the periodic table using their methods, they provide no evidence that they were in possession of the crystalline chemical compounds of this present invention or of any rare-earth tantalate or rare-earth niobate. Wong et al. asserts that 69 different elements may be used for each of A or B. However, the materials that they list as having made were restricted to Bi and Fe oxides of formulas $Bi_xM_yO_z$ and $M'_xFe_yO_z$ where M' is a transition metal. Materials of formulas $BiFeO_3$ and $Bi_2Fe_4O_9$ are specifically reported and claimed. Example syntheses reported by Wang et al. are for $BiFeO_3$, $Bi_2Fe_4O_9$, and $BiFeO_3$—$BaTiO_3$. None of the materials reported to have been made by Wong contain rare-earths and tantalates or rare-earths and niobates.

Given the unpredictable nature of the chemical art, there is no reason to believe that Wong et al. have successfully synthesized any rare-earth tantalates or rare-earth niobates. Therefore, Wong does not report the formation of the materials of this invention, and it does not enable one to fabricate rare-earth tantalates or rare-earth niobates of this present invention. Rather, the teachings of Wong set forth in the specification provided no more than a "plan" or "invitation" for those of skill in the art to experiment to try to obtain single crystalline ternary nanostructures composed of metals other than those actually demonstrated and reported by Wong.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

This invention comprises a class of rare-earth tantalates and rare-earth niobates that are suitable for forming nanoparticles and hydrothermal methods for forming them. Some embodiments are of the general chemical formula $LnAO_4$, $LnA_2O_7$, $Ln_2A_2O_7(OH)_2$, $Ln_{1-x}M_xA_2O_7$, $Ln_{2-x}M_xA_2O_7(OH)_2$, and $(Ln,RE,\square)_2A_2O_{7-x}(OH)_2$, where Ln is a lanthanide or rare earth (RE), $\square$ represents a vacancy, and A is Ta or Nb. In some embodiments, the lattice is doped with a light-emitting element such as a rare-earth emitter on a rare-earth lattice site and/or a transition metal emitter on a tantalum, niobium, or rare-earth site. When M is K, Rb, or Cs, the crystal structure is generally a pyrochlore structure for rare-earths smaller than $Nd^{3+}$. When M is Li or Na, the crystal structure is generally a structure other than the pyrochlore structure.

In some embodiments of this invention, the RETs and/or RENs are doped with luminescent metal ions; these materials can form nanoparticles that are efficient nanophosphors. The invention also comprises a synthetic method for forming the rare-earth Group 5 oxides with and without light-emitting dopants. The nanophosphors containing dopants provide the benefit of their small particle size reducing scattering losses. Additionally, the ability to vary the lattice enables tailoring of optical properties, such as broadening the excitation linewidth. A broader absorption linewidth can be quite advantageous in applications where, for example, a blue solid-state light emitter is to be used to pump a $Eu^{3+}$-based or $Tb^+$-based nanophosphor to provide efficient wavelength conversion for emission in the red or green, respectively. In some embodiments of this invention, $Eu^{3+}$-doped nanophosphors have been formed that can be directly excited by blue light and display quantum yields (QY) as high as 88%.

A hydrothermal method of synthesis can be employed in various embodiments. In such embodiments, the reaction solution is placed in a closed-cell reaction vessel and heated. Reaction conditions with temperatures in excess of 100° C. and pressures in excess of 1 atmosphere are obtained in embodiments of this invention. Several exemplary synthetic procedures are described below. While these provide examples of some embodiments, it is intended that variations on these procedures be considered additional embodiments of the present invention.

In one embodiment for the synthesis of $(La,K,\square)_2Nb_2(O,\square)_7(OH)_2$; ($\square$=vacancies) (1), lanthanum acetate (0.42 g, 1.35 mmol) is dissolved in 4 grams of DI water by stirring in a 23 ml Teflon cup for a Parr reactor, which is a closed-cell reactor suitable for use in hydrothermal synthesis. Other reaction vessels or reactors that are suitable for use for reactions conducted under pressure and at elevated temperatures may be used. Potassium citrate, tribasic (0.44 g, 1.35 mmol) is dissolved in 3 grams of DI water and added dropwise to the lanthanum acetate solution. A thick white precipitate of lanthanum citrate is formed immediately. The pH at this point is 8.4. Thirty drops of potassium hydroxide solution (4 molar) is added, and the precipitate redissolves after about 20 drops. $K_8[Nb_6O_{19}].16H_2O$ (0.33 g, 1.35 mmol Nb) is dissolved in 2 grams of water and added to the solution in the Parr reactor. Alternatively, the $K_8[Nb_6O_{19}].16H_2O$ can be dissolved directly in the lanthanum citrate solution. The final pH is recorded at 12.7. The reactor is closed in its steel casing and heated in a 225° C. box furnace for 3-4 days. A white crystalline powder is collected (approximately 0.8 grams; around 100% yield) by vacuum filtration and washing with DI water and then methanol. ~2.5% weight loss by TGA analysis (calculated=3%) Compositional analysis for $(La_{1.7}K_{0.1}\square_{0.2})Nb_2(O_{6.6}\square_{0.4})(OH)_2$ (FW=565.8). Calculated (from formula derived from X-ray data): 41.8% La, 32.9% Nb, 0.69% K. Experimental: 40.2% La, 30.0% Nb, 0.82% K.

In one embodiment for the synthesis of $La_2Ta_2O_7(OH)_2$ (2), a procedure that is substantially similar to that for $(La,K,\square)_2Nb_2(O,\square)_7(OH)_2$ except 0.42 grams of $K_7Na[Ta_6O_{19}].14H_2O^{15}$ (1.35 mmol Ta) is utilized as the tantalum source. The crystalline product is off-white in color and also ~100% yield (around 1 gram). Compositional analysis (FW=785.72): Calculated: 35.4% La, 46.1% Ta. Experimental: 34.9% La, 42.0% Ta. 2.5% weight loss by TGA analysis (calculated=2.3%)

In one embodiment for the synthesis of $Ln_2Ta_2O_7(OH)_2$ (Ln=Pr, Nd), the procedure to form these praseodymium and neodymium tantalate analogues of (2) is substantially the same as the procedure described above, except the synthesis of $Pr_2Ta_2O_7(OH)_2$ was carried out with 1.35 mmol (0.59 g) $Pr(NO_3)_3.6H_2O$, and $Nd_2Ta_2O_7(OH)_2$ was synthesized from 1.35 mmol (0.59 g) $Nd(NO_3)_3.6H_2O$.

Additional information about material embodiments made by the method described can be found in M. Nyman et al., "Aqueous Synthesis and Structural Comparison of Rare Earth Niobates and Tantalates: $(La,K,\square)_2Nb_2O_{7-x}(OH)_2$ and $Ln_2Ta_2O_7(OH)_2$ ($\square$=vacancy; Ln=La, Pr, Nd)," Chem. Matter. vol. 21 (2009) pp. 2201-2208, which is incorporated herein by reference. Structural information derived from X-ray powder diffraction measurements for two of the compounds is provided in Table 1.

A summary of some embodiments is presented in Table 2.

TABLE 1

Structural information for (1) and (2)

|  | $(La,K,\square)_2Nb_2(O,\square)_7(OH)_2$ (1) | $La_2Ta_2O_7(OH)_2$ (2) |
|---|---|---|
| Formula weight | 565.8 | 785.72 |
| Space group | Monoclinic P $2_1$/c (no. 14) | Monoclinic P $2_1$/c (no. 14) |
| a (Å) | 14.0652(2) | 14.17107 (6) |
| b (Å) | 3.94128(4) | 3.93027(2) |
| c (Å) | 6.74765(8) | 6.72014(3) |
| β(*) | 91.282(1) | 91.0849(4) |
| Å$^3$ | 373.961(5) | 374.218(2) |
| Density, calculated g/cm$^3$ | 5.066 | 6.955 |
| Z | 4 | 4 |
| $R_p$ | 6.5 | 5.6 |

TABLE 2

Summary of Syntheses of Rare-earth Analogues of (2)

| Rare-earth Cation (Ln$^{3+}$) | | La | Ce | Pr | Nd | Sm | Eu |
|---|---|---|---|---|---|---|---|
| Ionic radius (Å) | | 1.17 | 1.15 (3+) 1.01 (4+) | 1.13 | 1.12 | 1.10 | 1.09 |
| Unit cell parameters of $Ln_2Ta_2O_7(OH)_2$ (analogues of (2)) a, b, c (Å); β(°); V (Å$^3$) | | 14.17107 (6) 3.93027 (2) 6.72014 (3) 91.0849 (4) 374.218 (2) | 14.16 (1) 3.872 (3) 6.578 (4) 90.9 (1) 360.6 (1) | 14.067 (8) 3.904 (4) 6.667 (6) 90.75 (7) 366.09 (5) | 14.007 (2) 3.890 (1) 6.634 (2) 90.741 (1) 361.42 (5) | 13.922 (2) 3.872 (1) 6.612 (1) 90.60 (1) 356.4 (1) | None formed |
| Ratio Ln:Ta in synthesis | 1:1 | (2) | (2) & pyrochlore* | (2) | (2) | (2) & pyrochlore | pyrochlore |
|  | 1:2 | KTaO$_3$ & (2) |  |  | (2) & pyrochlore | (2) & pyrochlore | perovskite |

*Mostly pyrochlore: dark brown, indicating Ce$^{4+}$ (see text). The pyrochlore structure is cubic with a space group of Fd3m Some rare-earth dopant ions that are suitable for incorporation on rare-earth sites include but are not restricted to Eu$^{3+}$, Tm$^{3+}$, Dy$^{3+}$, Pr$^{3+}$, Sm$^{3+}$, Ce$^{3+}$, Tb$^{3+}$, Er$^{3+}$, Ho$^{3+}$, Nd$^{3+}$, and Gd$^{3+}$.

In one embodiment for the synthesis of $KLnTa_2O_7$:RE nanoparticles (Ln=Y,Gd,Lu; RE=Eu,Tb). The synthesis is substantially the same as that of the lanthanum tantalate and niobate, $La_2A_2O_7(OH)_2$; A=Nb, Ta. Briefly, in 4 ml DI water, 0.55 mmols of the lanthanide salt (i.e. $LuCl_3.6H_2O$, $YCl_3.6H_2O$, $GdCl_3.6H_2O$) is dissolved with stirring, in a 20 ml glass vial. These nanoparticles can be made doped or undoped. For the doped materials, the appropriate amount of dopant, for example, europium chloride or terbium chloride or another precursor source of europium, terbium, or other lanthanide dopant metal ion (usually ~0.1 mmols), is combined with the lanthanide host metal salt and dissolved. Some rare-earth dopant ions that are suitable for incorporation on rare-earth sites include but are not restricted to $Eu^{3+}$, $Tm^{3+}$, $Dy^{3+}$, $Pr^{3+}$, $Sm^{3+}$, $Ce^{3+}$, $Tb^{3+}$, $Er^{3+}$, $Ho^{3+}$, $Nd^{3+}$, and $Gd^{3+}$. Transition metal dopants can also be incorporated on the A site. Some transition metal dopant ions that are suitable for incorporation on the A site include but are not restricted to $Mn^{2+}$, $Cr^{3+}$, $Bi^{3+}$, and $Sb^{3+}$. In a separate vial, a molar equivalent of potassium citrate to the host lanthanide salt plus dopant lanthanide salt is dissolved in 3 ml DI water. For instance, for 0.50 mmols host lanthanide salt and 0.05 mmol dopant lanthanide salt, 0.60 potassium citrate is utilized. In a third vial, potassium hexatantalate, $K_8[Ta_6O_{19}] \cdot 16H_2O$ (1.10 mmols Ta, 0.36 g) is dissolved in 2 ml DI water. The potassium citrate solution is added via pipette to the lanthanide salt solution, upon which a thick white precipitate forms. Thirty drops of 4 molar aqueous KOH solution is added while stirring, and the precipitate re-dissolves (usually after ~10 drops). Then the lanthanide citrate solution and the potassium hexatantalate solutions are combined in a 23 ml Teflon cup for a Parr® reactor. Alternative closed-cell reactor vessels can also be used. The Teflon cup is enclosed in its steel reactor and placed in a 220° C. box furnace for three days. Alternative temperatures and reaction times can be employed.

The pyrochlore nanoparticles are precipitated as powders at the bottom of the Teflon reactor. They are not collected by standard vacuum filtration, since they go right through the filter paper, due to their small size. Rather, the slurry is poured into a 15 ml conical centrifuge tube and spun at 4500 rpm for 10-20 minutes. The reaction liquid is pour off and DI water is added and the mixture is stirred to wash off excess salt. In the DI water, not all the nanoparticles can be spun down, so a suspension is also acquired by this rinsing process. After two rinses, the suspension can be is retained for TEM characterization, and the solid is placed at a drying oven at 35° C. Upon vaporization of the water, a semi-transparent monolithic solid is obtained.

In one embodiment for the synthesis of $KLuTa_2O_7$:RE-$Lu_2O_3$ nanoparticles, the procedure is the same for that described above, except the amount of $LuCl_3 \cdot 6H_2O$ is doubled to 1.10 mmols, and the amount of potassium citrate is appropriately increased.

Additional information about these and similar embodiments made by the method described above can be found in M. Nyman et al., "Highly Versatile Rare-earth Tantalate Pyrochlore Nanophosphors," J. Amer. Chem. Soc. vol. 131 (2009) pp. 11652-11653, and supplemental information for this article on file and accessible at JAGS web site, which are incorporated herein by reference.

Figure 2:
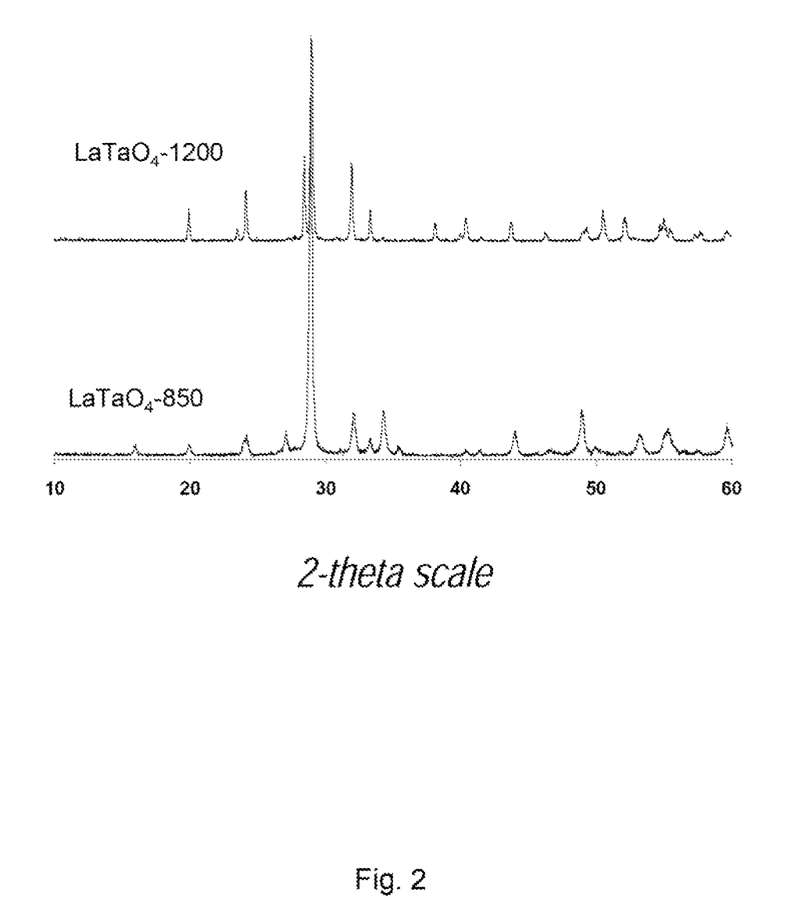
FIG. 2 presents the powder X-ray diffraction spectra of two $LaTaO_4$ polymorphs. The bottom spectrum is the polymorph formed at 850° C. The top spectrum is the polymorph formed at 1200° C.

In some embodiments, thermal dehydration of $La_2Ta_2O_7(OH)_2$ results in the crystallization of a new orthotantalate-$LaTaO_4$ polymorph, before converting to a previously reported orthorhombic $LaTaO_4$ ($Cmc2_1$) polymorph at 1200° C. In this present report, we describe the structural solution from X-ray powder data of the new orthotantalate, referred to herein as LaTa-850. In-situ heating and X-ray diffraction provided observation of the structural evolution from $La_2Ta_2O_7(OH)_2$ (LaTa—OH) to LaTa-850 to the 1200° C. $LaTaO_4$ polymorph (LaTa-1200). While LaTa—OH, LaTa-1200 and two other previously-reported polymorphs of $LaTaO_4$ all share similar structural features, the structure of LaTa-850 is notably different. Powder X-ray diffraction spectra of the 850° C. and 1200° C. polymorphs are presented in FIG. 2.

In one embodiment for the synthesis of LaTa—OH, LaTa-850 and LaTa-1200, $La_2Ta_2O_7(OH)_2$ (LaTa—OH) and $Eu^{3+}$-doped LaTa—OH were synthesized in a method similar to that described above. Briefly, $LaCl_3 \cdot 6H_2O$ (0.43 g for 10% Eu-doped, 0.46 g for 5% Eu-doped) and $EuCl_3 \cdot 6H_2O$ (0.048 g for 10% Eu-doped, 0.024 g for 5% Eu-doped) are dissolved in 4 ml DI $H_2O$. The total amount lanthanum plus europium salt is 1.3 millimoles. Potassium citrate (0.42 g, 1.3 millimoles) is dissolved in 3 ml DI water. This solution is added dropwise to the lanthanide salt solution while stirring vigorously, which results in formation of a thick lanthanide citrate precipitate. Thirty drops of 4M KOH solution is then added, and the precipitate re-dissolves. The potassium hexatantalate salt (0.42 g) is dissolved in 2 ml DI $H_2O$ and combined with the lanthanide citrate solution in a 24 ml Teflon liner for a Parr reactor. The Parr reactor is placed in a 220° C. oven for 3 days. The white microcrystalline product is collected by vacuum filtration. LaTa-850 is formed by heating dry powder LaTa—OH at 850° C. for two hours. LaTa-1200 is formed by heating dry powder LaTa—OH at 1200° C. for two hours.

Additional information about material embodiments made by the method described can be found in M. Nyman et al., "A Unique $LaTaO_4$ Polymorph for Multiple Energy Applications," Chem. Matter. vol. 21 (2009) pp. 4731-4737, which is incorporated herein by reference. Structural information for two of the compounds are provided in Tables 3 and 4.

TABLE 3

Structural information, comparing LaTa-850 to LaTa-1200*

|  | $LaTaO_4$-850 | $LaTaO_4$-1200 |
|---|---|---|
| Formula weight | 383.85 | 383.85 |
| Space group | Orthorhombic | Orthorhombic |
|  | Pbca (no. 61) | $Cmc2_1$, (no. 36) |
| a (Å) | 7.8286(1) | 3.9313 (9) |
| b (Å) | 11.2180(1) | 14.793 (3) |
| c (Å) | 7.4642(1) | 5.618 (2) |
| Volume (Å$^3$) | 655.52(1) | 326.72 (2) |
| Density, calculated g/cm$^3$ | 7.778 | 7.803 |
| Z | 8 | 4 |
| $R_{Bragg}$, (%) | 7.61 | N/A |
| $\chi^2$ | 0.81 | N/A |
| $R_p$ (%) | 7.1 | N/A |
| $R_{wp}$ (%) | 9.4 | N/A |

*From Slobodyanik et al., Dopov. Nats. Akad Nauk Ukr. (2003) p. 140-145.

TABLE 4

Atomic Parameters for LaTa-850

| Site | multiplicity | x | y | z | Bk. (A2) |
|---|---|---|---|---|---|
| La1 | 8 | 0.8660 (3) | 0.02413 (7) | 0.7433 (3) | 2.9 (1) |
| Ta1 | 8 | 0.6242 (4) | 0.24212 (9) | 0.4976 (3) | 2.13 (1) |
| O1 | 8 | 0.651 (2) | 0.3092 (6) | 0.761 (3) | 0.95 (1) |
| O2 | 8 | 0.634 (3) | 0.4121 (9) | 0.464 (2) | 0.95 (1) |
| O3 | 8 | 0.873 (5) | 0.262 (1) | 0.479 (2) | 0.95 (1) |
| O4 | 8 | 0.388 (3) | 0.5658 (9) | 0.905 (1) | 0.95 (1) |

A wide variety of materials can be made in various embodiments of the synthetic method of this invention. The method can be employed for making a wide range of rare-earth Group 5 oxides, where the Group 5 oxide is at least one of a tantalate or a niobate. The method comprises preparing an aqueous solution of a complexed rare-earth ion, wherein the pH of the aqueous solution is suitable for retaining the complexed rare-earth ion in solution; adding a Group 5 oxide ion to the aqueous solution; and reacting the complexed rare-earth ion and the Group 5 oxide ion under hydrothermal reaction conditions to form a rare-earth Group 5 oxide. Hydrothermal reaction conditions are conditions wherein the interior of the reaction vessel is at a pressure in excess of atmospheric pressure. This can be achieved by heating a closed (sealed) reaction vessel to a temperature where the vapor pressure of the aqueous solution exceeds one atmosphere. In some embodiments, a pressure greater than 1 atmosphere can be externally applied.

A variety of suitable source materials for the rare-earth ion can be employed. Soluble salts of rare-earth (RE) ions are employed; examples include but are not restricted to acetates, nitrates, chlorides, and other RE salts that may be soluble. The rare earth can be selected from Elements 57-71. A plurality of different rare-earths can be employed in various embodiments. Smaller lanthanides yield smaller unit cells. Various embodiments of this invention are new compositions of pyrochlore. For $LnMTa_2O_7$ of structure cubic Fd-3m, the a-parameter ranges from ~1.02 to 1.06 nm. Unit cell parameters also decrease for the niobates compared to the analogous tantalates. When two or more rare-earth ions are employed, one of them may be an ion capable of emitting light at a desired frequency when excited; the emitting rare earth may be present at concentration levels considered to be dopant concentration levels. Some rare-earth dopant ions that are suitable for incorporation on rare-earth sites include but are not restricted to $Eu^{3+}$, $Tm^{3+}$, $Dy^{3+}$, $Pr^{3+}$, $Sm^{3+}$, $Ce^{3+}$, $Tb^{3+}$, $Er^{3+}$, $Ho^{3+}$, $Nd^{3+}$, and $Gd^{3+}$. Some transition metal dopants that are suitable for incorporation on tantalum or niobium sites include but are not restricted to $Mn^{2+}$, $Cr^{3+}$, $Mn^{4+}$, $Bi^{3+}$, and $Sb^{3+}$. The rare-earth site is 8-coordinate and readily accommodates ions of suitable size for such 8-coordination. Embodiments of this synthetic method can be used to prepare materials ranging from those with the largest lanthanide (La) to the smallest lanthanide (Lu), thus being suitable for matching the size of any desired RE emitter dopant species. A wide range of RE dopant species concentrations may be employed as desired, including concentrations that might be considered stoichiometric rather than dopant, due to the similarity in size of all the lanthanide ions. The Ta/Nb site is 6-coordinate, and embodiments of this synthetic method are suitable for incorporating any dopant species with a suitable ionic radius for residing on such 6-coordinate sites. In some embodiments, more than one dopant species, i.e., a co-dopant, may be incorporated into the RE Group 5 oxide matrix.

In some embodiments, the lattice may be doped with a non-emitting species to provide distortion of the lattice symmetry to improve emission. For example, dopants like $Eu^{3+}$ emit intense light (red for $Eu^{3+}$) when they occupy sites that lack inversion symmetry. Examples of non-emitting dopants include but are not restricted to $Si^{4+}$, $P^{5+}$, $Tb^{4+}$, $Nb^{5+}$, $Bi^{3+}$, $Ca^{2+}$, $Ba^{2+}$, and $La^{3+}$. Examples of precursor species for such dopants include but are not restricted to phosphorus pentoxide and sodium phosphate for $P^{5+}$, sodium silicate, tetraethyl orthosilicate, and tetramethyl orthosilicate for $Si^{4+}$, and soluble metal salts including but not restricted to acetates, chlorides, and nitrates.

Figure 3:
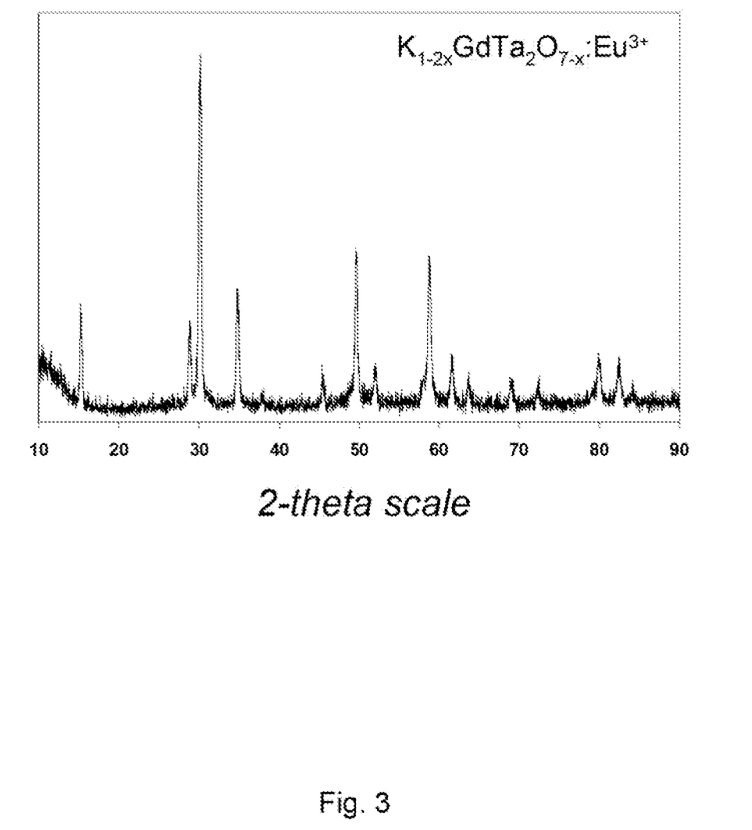
FIG. 3 presents the X-ray diffraction pattern of $K_{1-2x}GdTa_2O_{7-x}:Eu^{3+}$.
Figure 4:
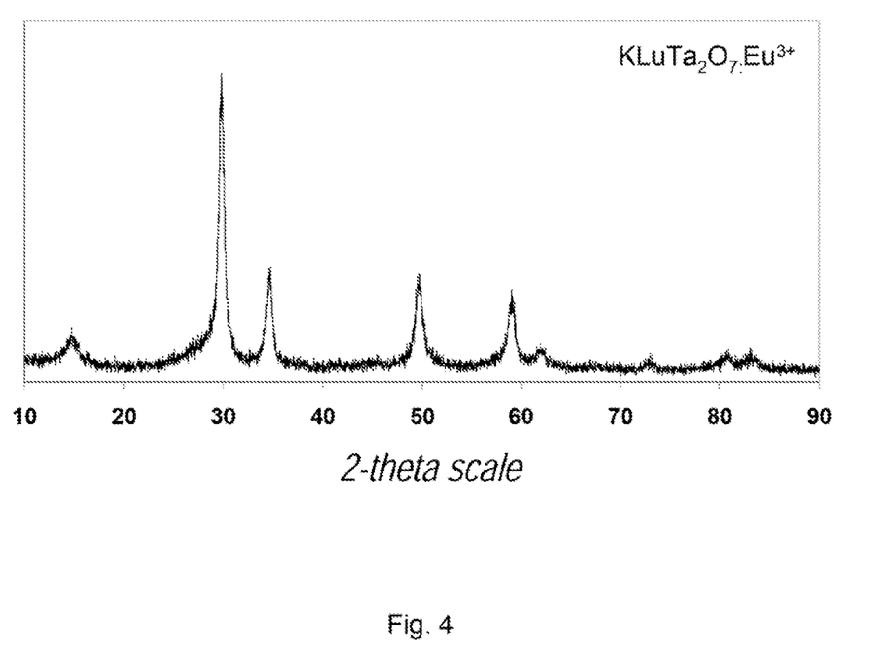
FIG. 4 presents the X-ray diffraction pattern of $KLuTa_2O_7:Eu^{3+}$.

Some of embodiments that include $Eu^{3+}$ as an emitter dopant that have been made using variations of this hydrothermal synthetic method include the following $LaTaO_4$:Eu, $KLuTa_2O_7$:Eu, $KGdTa_2O_7$:Eu, $KYTa_2O_7$:Eu, and $K(Gd,Y)Ta_2O_7$:Eu. The structural parameters for some of these materials are listed in Table 5. The phosphors have substantially the same structure as the undoped matrix. The X-ray diffraction spectra of $K_{1-2x}GdTa_2O_{7-x}$:$Eu^{3+}$ and $KLuTa_2O_7$:$Eu^{3+}$ are presented in FIGS. 3 and 4, respectively.

TABLE 5

Structural information for several phosphors.

|  | $LaTaO_4$-850 | $LaTaO_4$-1200 | $KLuTa_2O_7$ | $KYTa_2O_7$ | $K_{1-2x}GdTa_2O_{7-x}$; x = 1/3 |
|---|---|---|---|---|---|
| Space group | Orthorhombic Pbca (no. 61) | Orthorhombic Cmc2$_1$ (no. 36) | Cubic F d-3 m | Cubic F d-3 m | Cubic F d-3 m |
| a (Å) | 7.8286(1) | 3.9313 (9) | 10.385(1) | 10.447(1) | 10.538(2) |
| b (Å) | 11.2180(1) | 14.793 (3) | | | |
| c (Å) | 7.4642(1) | 5.618 (2) | | | |
| Volume (Å$^3$) | 655.52(1) | 326.72 (2) | 1120.0 (1) | 1140.2 (1) | 1170.2 (2) |

Their niobate analogs may also be made using embodiments of this method. In other embodiments, the hydrothermal synthetic method of this invention can be used to form alkaline earth tantalates, alkali tantalates, and scandium tantalates and their niobate analogs. $(La_{1-x}Eu_x)TaO_4$ forms a new polymorph if the Eu=10%, La=90%. For Eu>15%, a previously known structural polymorph forms although the compound is of a new composition. For doping $Eu^{3+}$ into the hydrous phase $(La,K,\square)_2Nb_2(O,\square)_7(OH)_2$, up to 10% Eu has been incorporated. For higher Eu dopant concentrations, a transition to $LnNbO_4$ phase is to be expected due to effects of differing atomic radii.

Addition of a chelating agent may lead to precipitation of the chelated RE ion, which is a complexed RE ion. Addition of a chelating agent may be used to impart solubility to rare-earths and transition metals by forming a soluble complex. A wide variety of chelating species may be employed. Examples include but are not restricted to citrate, ethylenediamine tetraacetic acid (EDTA) and salts thereof, ethanol triamine, diamines, diketonates, dicarboxylates, and amino acids.

If precipitation occurs, the chelated RE species can be dissolved by adjustment of the pH of the chelate solution. This may be accomplished by addition of a base. Examples of suitable bases include but are not restricted to hydroxides and other bases, such as amines, that produce hydroxide when dissolved in the solution. Some suitable hydroxides include but are not restricted to CsOH, RbOH, KOH, NaOH, LiOH, and $NH_4OH$. In many embodiments where the counter ion is $K^+$, $Rb^+$, or $Cs^+$, the crystal structure that is obtained is the pyrochlore structure.

In some embodiments, the chelating ion and the hydroxide may have the same counter ion. In other embodiments, the counter ion may be different. For those ions that produce the same crystal structure, such as, for example, $Cs^+$, $Rb^+$, and $K^+$, using more than one type of counter ion may be expected to produce the same pyrochlore structure.

In some embodiments where the alkali is a stoichiometric component of the oxide phase, pyrochlores being an example, the counterion is chosen to be the one desired in the final product. In some embodiments, the counterion may be a species that functions as a dopant, some examples being some of the lanthanum niobates.

In some embodiments, the tantalate or niobate source compound is dissolved in aqueous solution prior to addition to the rare-earth-containing solution. On other embodiments, the tantalate or niobate source compound is added directly as a solid to the rare-earth-containing solution and dissolved therein. In some embodiments, the Group 5 oxide source is a Lindqvist ion polyoxometalate, $[T_6O_{19}]^{8-}$, (T=Nb, Ta). In some embodiments, the Group 5 oxide source is a peroxometalate, $[T(O_2)_4]^{3-}$, (T=Nb, Ta). The counter ion may be but is not restricted to $NH_4$, K, Rb, Cs, Na, Li, or $N(CH_3)_4$ cations.

Figure 1:
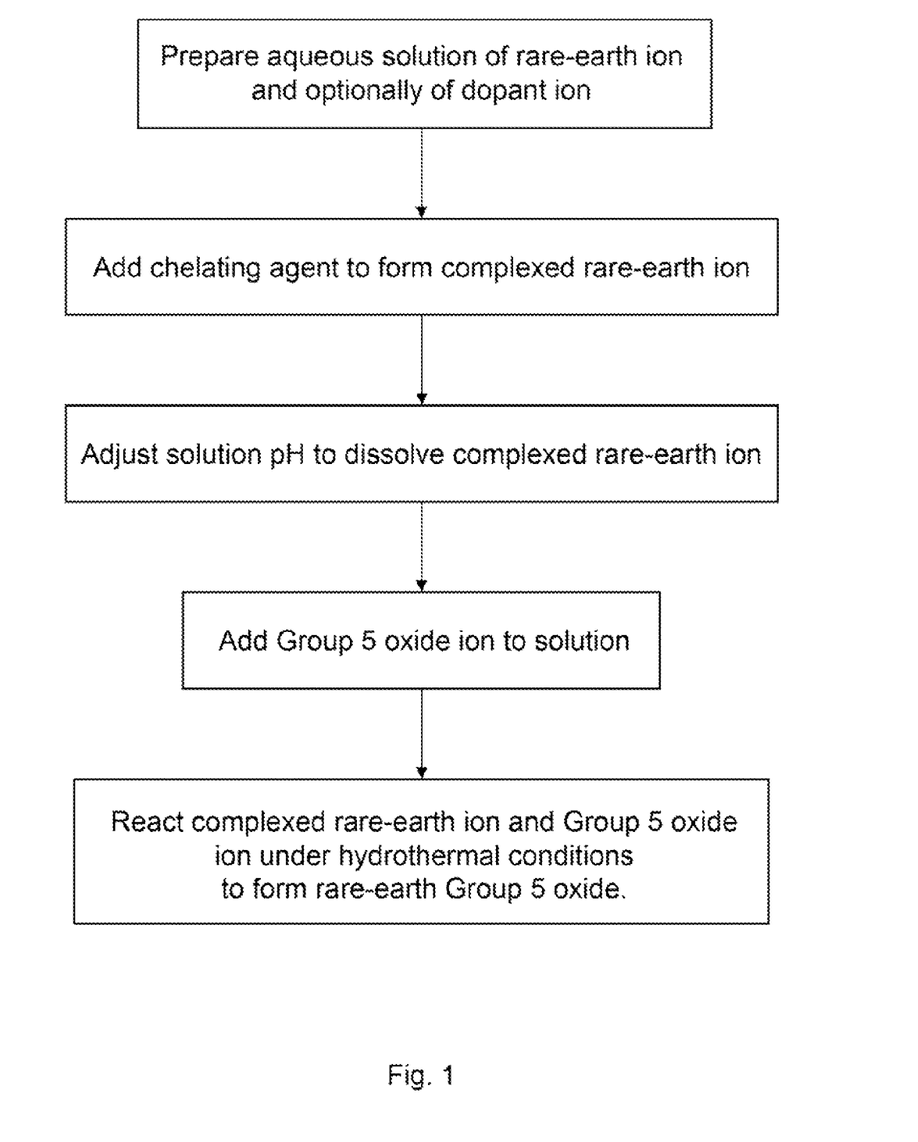
FIG. 1 illustrates an embodiment of the hydrothermal method of synthesis of rare-earth Group 5 metalates.

FIG. 1 illustrates one embodiment of the hydrothermal synthetic method suitable for forming numerous embodiment materials of this invention. Since rare-earth oxides are soluble in acidic solutions while tantalates and niobates are soluble in basic solutions, the rare-earth species are rendered soluble by forming chelates thereof that are soluble in basic solution.

Figure 5:
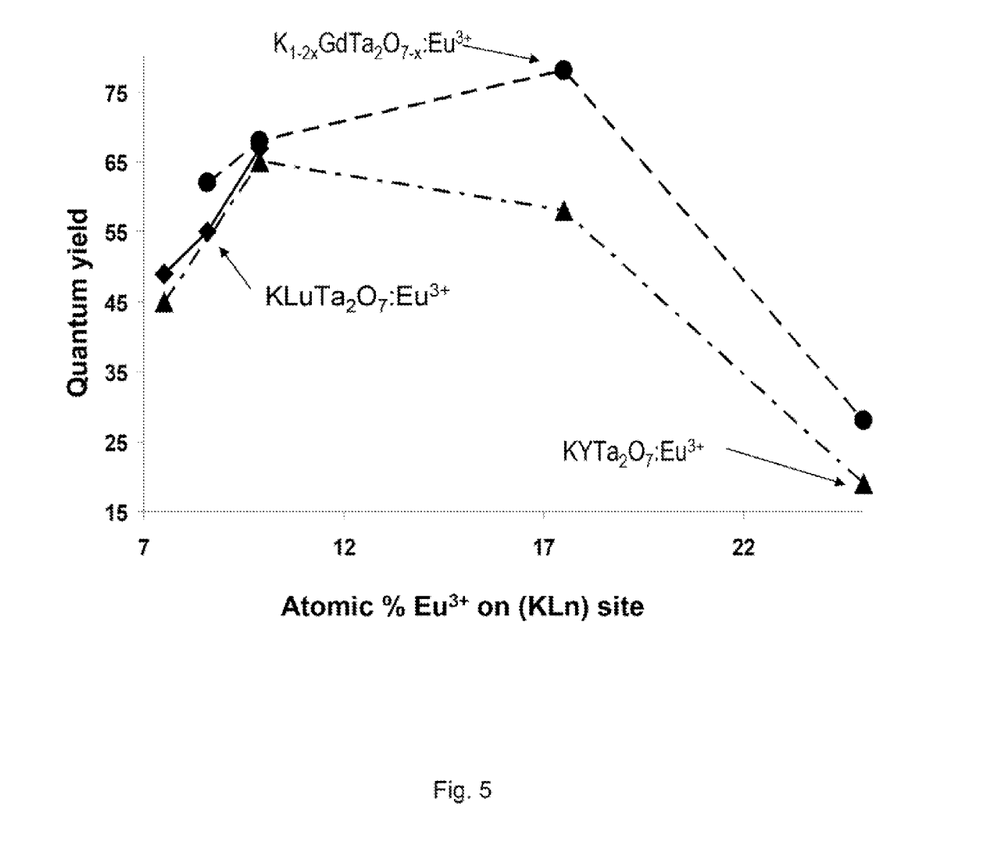
FIG. 5 illustrates the quantum yield of Y, Gd, and Lu variants of $KLnTa_2O_7:Eu^{3+}$ and $K_{1-2x}GdTa_2O_{7-x}:Eu^{3+}$ excited by blue light lamp. Similar behavior is obtained with UV light.
Figure 6:
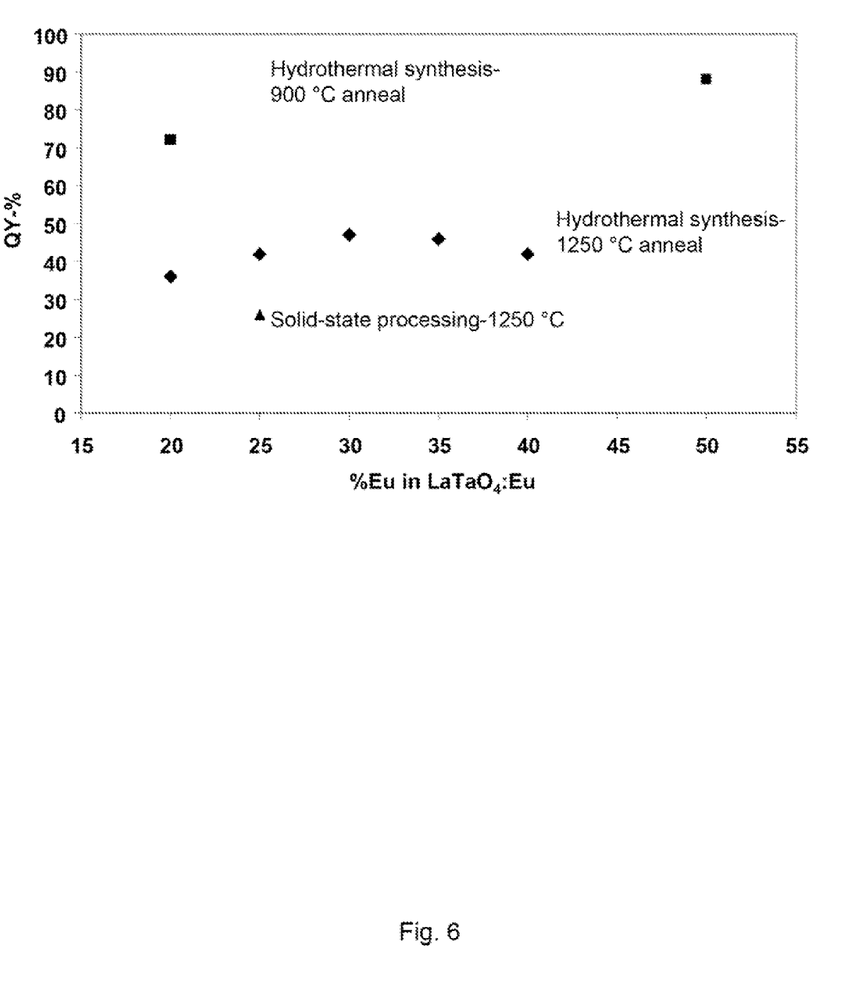
FIG. 6 illustrates the quantum yield of red emission under blue excitation of $LaTaO_4$, with greater than 10% Eu substitution.

Doped rare-earth Group 5 metalates that are embodiments of this invention display good performance as phosphors. Table 6 lists the quantum yields of some LaTaO$_4$:Eu polymorphs excited by blue light. FIG. 5 illustrates the quantum yield of Y, Gd, and Lu variants of KLnTa$_2$O$_7$:Eu$^{3+}$ and $K_{1-2x}GdTa_2O_{y-x}$:Eu$^{3+}$ excited by blue light. Similar behavior is obtained with UV light. FIG. 6 illustrates the quantum yield of red emission under blue excitation of LaTaO$_4$, with greater than 10% Eu substitution. The squares and diamonds were synthesized hydrothermally as $La_{2-x}Eu_xTa_2O_7$, and then annealed at either 900° C. or 1250° C. The triangle was synthesized by traditional solid-state processing. The hydrothermal syntheses, annealed at lower temperatures have substantially higher quantum yield.

TABLE 6

Quantum Yield of LaTaO$_4$:Eu polymorphs excited at 464 nm

| LaTaO$_4$ polymorph, Eu concentration | QY |
|---|---|
| LaTa-850, 10% | 55 |
| LaTa-850, 5% | 51 |
| LaTa-1200, 10% | 14.8 |
| LaTa-1200, 5% | 6.8 |

In some embodiments, annealing is performed in a tube furnace or muffle furnace, with the powder contained in a ceramic crucible. The temperature that is employed depends on the desired phase for a particular embodiment. For instance, the pyrochlores cannot be annealed above 900° C. The orthotantalate (LnTaO$_4$) polymorphs differ as a function of temperature, with intermediate-temperature polymorphs forming around 900° C. and higher temperature polymorphs crystallizing with annealing at 1200° C. For some embodiments, the time of annealing for optimal quantum yield is 1-3 hours, but there is no limitation on annealing time based on the stability of the material. Shorter or longer times may be employed as long as the time is sufficient to produce the desired product at the employed temperature or range of temperatures. In some embodiments, the temperature may be varied during the annealing time. The annealing may be done with or without a controlled atmosphere. For some embodiments, a reducing atmosphere might be desired. For example, the controlled atmosphere might comprise forming gas (3% H$_2$ in Argon) to reduce a dopant or stoichiometric ion. An illustrative example is the reduction of Eu$^{3+}$ to Eu$^{2+}$ to change its adsorption and emission properties. Other embodiments might use a controlled atmosphere to achieve a desired stoichiometry. For example, some embodiments might employ annealing in an oxygen-free environment or an atmosphere sufficiently low in oxygen to enable generation of oxygen vacancies.

To improve the consistency of quantum yields based on particle morphology, the following. process can be employed. A tantalate phosphor powder was combined with alcohol (methanol, ethanol or isopropanol) plus yttria-stabilized zirconia (YSZ) mixing beads in a 60 ml test tube or centrifuge tube. The alcohol-powder slurry was then shaken using a shaker-mixer for 40-90 minutes. The powder was re-isolated by centrifugation and dried under vacuum. Annealing could be carried out before and/or after the shaking process to optimize quantum yield.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A rare-earth oxyhydroxide wherein the rare-earth oxyhydroxide has a formula Ln$_2$A$_2$O$_7$(OH)$_2$, wherein Ln is the rare earth and A is at least one of Ta and Nb.

2. The rare-earth oxyhydroxide of claim 1, wherein Ln is selected from the group consisting of Ce, Nd, and Sm.

3. The rare-earth oxyhydroxide of claim 1, wherein the rare-earth oxyhydroxide has a cubic space group of Fd-3m and has a formula Ln$_2$Ta$_2$O$_7$(OH)$_2$ wherein Ln is selected from the group consisting of Ce, Nd, Sm, and Eu.

4. A rare-earth oxyhydroxide wherein the rare-earth oxyhydroxide has a cubic space group of Fd-3m and has a formula Ln$_2$Ta$_2$O$_7$(OH)$_2$:RE wherein Ln is selected from the group consisting of Ce, Nd, Sm, and Eu and wherein RE is a dopant on an Ln site selected from the group consisting of rare earth ions.

5. A rare-earth oxide, wherein the rare-earth oxide has a cubic space group of Fd-3m and has a formula MLnTa$_2$O$_7$ wherein Ln is Y or Lu and wherein M is selected from the group consisting of Li, Na, K, Rb, and Cs.

6. A rare-earth oxide, wherein the rare-earth oxide has a cubic space group of Fd-3m and has a formula KLnTa$_2$O$_7$:RE wherein Ln is Y or Lu and RE is a dopant on an Ln site selected from the group consisting of rare earth ions.

7. A rare-earth oxide, wherein the rare-earth oxide has a cubic space group of Fd-3m and has a formula M$_{1/3}$GdTa$_2$O$_{20/3}$:RE wherein RE is a dopant on a Gd site selected from the group consisting of rare earth ions.

8. A rare-earth oxide, wherein the rare-earth oxide has a formula M$_{1-2x}$LnA$_2$O$_{7-x}$ wherein 0≤x≤⅓, Ln is a rare earth selected from the group consisting of Y, Lu, and Gd, A is at least one of Ta and Nb, and M is selected from the group consisting of K, Sc, and Rb.

9. The rare-earth oxide of claim 8, wherein the rare-earth oxide has a cubic space group of Fd-3m and has a formula M$_{1/3}$GdTa$_2$O$_{20/3}$.

10. A rare-earth oxyhydroxide, wherein the rare-earth oxyhydroxide has a monoclinic space group P2$_1$/c and is selected from the group consisting of (Ln,M,□ )$_2$Nb$_2$(O,□ )$_7$(OH)$_2$, (Ln,M,□ )$_2$Nb$_2$(O,□ )$_7$(OH)$_2$:RE, Ln$_2$Ta$_2$O$_7$(OH)$_2$, and Ln$_2$Ta$_2$O$_7$(OH)$_2$:RE, wherein for (Ln,M,□ )$_2$Nb$_2$ $(O,\square)_7(OH)_2$ and $(Ln,M,\square)_2Nb_2(O,\square)_7(OH)_2:RE$, $\square$ is a vacancy, Ln is selected from the group consisting of La, Ce, Pr, Nd, and Sm, RE is a dopant selected from the group consisting of rare earth ions and transition metal ions, and M is selected from the group consisting of K, Cs and Rb, and wherein for $Ln_2Ta_2O_7(OH)_2$ and $Ln_2Ta_2O_7(OH)_2:RE$, Ln is selected from the group consisting of La, Ce, Pr, Nd, and Sm, and RE is a dopant selected from the group consisting of rare earth ions and transition metal ions.

11. The rare-earth oxyhydroxide of claim 10, wherein the rare earth ions are selected from the group consisting of cerium, praseodymium, neodymium, samarium, europium, terbium, dysprosium, erbium, thulium, gadolinium, and holmium.

* * * * *